(12) United States Patent
Cai et al.

(10) Patent No.: US 11,493,153 B2
(45) Date of Patent: Nov. 8, 2022

(54) STITCHED DOUBLE LAYER COMPOSITE HOSE AND MANUFACTURING METHOD THEREOF

(71) Applicant: Nantong Beca Machinery Technology Co. LTD, Jiangsu (CN)

(72) Inventors: Baoxiang Cai, Jiangsu (CN); Weifeng Cai, Jiangsu (CN); Lihai Cai, Jiangsu (CN); Zhongyao Huang, Jiangsu (CN)

(73) Assignee: Nantong Beca Machinery Technology Co. LTD, Nantong (CN)

( * ) Notice: Subject to any disclaimer, the term of this patent is extended or adjusted under 35 U.S.C. 154(b) by 678 days.

(21) Appl. No.: 16/524,122

(22) Filed: Jul. 28, 2019

(65) Prior Publication Data

US 2019/0346073 A1 Nov. 14, 2019

Related U.S. Application Data

(62) Division of application No. 15/127,410, filed as application No. PCT/CN2015/095244 on Nov. 23, 2015, now abandoned.

(30) Foreign Application Priority Data

| Dec. 9, 2014 | (CN) | 201410743605.X |
| Jan. 29, 2015 | (CN) | 201510043462.6 |
| Aug. 17, 2015 | (CN) | 201510500128.9 |

(51) Int. Cl.
*F16L 11/08* (2006.01)
*B29C 48/153* (2019.01)
(Continued)

(52) U.S. Cl.
CPC .......... *F16L 11/087* (2013.01); *B29C 48/153* (2019.02); *B32B 1/08* (2013.01);
(Continued)

(58) Field of Classification Search
CPC ........ F16L 11/087; F16L 11/02; F16L 11/085; F16L 11/08; F16L 11/086; F16L 58/109;
(Continued)

(56) References Cited

U.S. PATENT DOCUMENTS

| 19,625 A | 3/1858 | Cooley et al. |
| 299,017 A | 5/1884 | Schenck et al. |

(Continued)

FOREIGN PATENT DOCUMENTS

| CN | 104235530 | 12/2014 |
| CN | 204062227 | 12/2014 |

(Continued)

OTHER PUBLICATIONS

European opinion of the EP 15868375.5.
(Continued)

*Primary Examiner* — Craig M Schneider
*Assistant Examiner* — David R Deal
(74) *Attorney, Agent, or Firm* — Dragon Sun Law Firm, PC; Jinggao Li; Nathaniel Perkins (57) ABSTRACT

A stitched double layer composite hose is provided. The stitched double layer composite hose includes a middle fabric pipe layer, an inner surface composite colloid material layer and an outer surface composite colloid material layer. The structure of the fabric pipe layer is weft-stitched double-layer unit structure. The double-layer unit structure includes an outer layer, an inner layer and stitched wefts. The inner layer includes inner layer warps and inner layer wefts; the outer layer includes outer layer warps and outer layer wefts. The stitched wefts interweave with the outer layer warps and the inner layer warps for conjoining the inner layer and the outer layer together. The fabric pipe layer weaved solves problems of the stitched double layer composite hose in the fabric pipe layer of traditional casing, with such advantages (Continued)

as high flexibility, less weaving point, less loss of yarn strength and less degree of torsion.

4 Claims, 4 Drawing Sheets

(51) Int. Cl.

| | | |
|---|---|---|
| *F16L 11/02* | (2006.01) | |
| *D03D 11/00* | (2006.01) | |
| *B32B 27/40* | (2006.01) | |
| *B32B 5/06* | (2006.01) | |
| *B32B 27/12* | (2006.01) | |
| *B32B 5/26* | (2006.01) | |
| *B32B 25/10* | (2006.01) | |
| *B32B 1/08* | (2006.01) | |
| *B32B 5/02* | (2006.01) | |
| *D03D 3/02* | (2006.01) | |
| *F16L 58/10* | (2006.01) | |
| *B29C 48/09* | (2019.01) | |
| *B29C 48/10* | (2019.01) | |
| *B29C 48/151* | (2019.01) | |
| *B29C 48/152* | (2019.01) | |

(52) U.S. Cl.
CPC ............... *B32B 5/024* (2013.01); *B32B 5/06* (2013.01); *B32B 5/26* (2013.01); *B32B 25/10* (2013.01); *B32B 27/12* (2013.01); *B32B 27/40* (2013.01); *D03D 3/02* (2013.01); *D03D 11/00* (2013.01); *F16L 11/02* (2013.01); *F16L 11/085* (2013.01); *B29C 48/09* (2019.02); *B29C 48/10* (2019.02); *B29C 48/151* (2019.02); *B29C 48/152* (2019.02); *B32B 2255/02* (2013.01); *B32B 2255/26* (2013.01); *B32B 2274/00* (2013.01); *B32B 2307/204* (2013.01); *B32B 2307/402* (2013.01); *B32B 2307/50* (2013.01); *B32B 2307/546* (2013.01); *B32B 2597/00* (2013.01); *F16L 11/08* (2013.01); *F16L 11/086* (2013.01); *F16L 58/109* (2013.01)

(58) Field of Classification Search
CPC ....... B29C 48/153; B29C 48/10; B29C 48/09; B29C 48/152; B29C 48/151; B32B 1/08; B32B 5/024; B32B 5/06; B32B 5/26; B32B 5/10; B32B 27/12; B32B 27/40; B32B 2255/02; B32B 2255/26; B32B 2274/00; B32B 2307/204; B32B 2307/402; B32B 2307/50; B32B 2307/546; B32B 2597/00; B03D 3/02; B03D 11/00
USPC ......................................................... 138/123
See application file for complete search history.

(56) References Cited

U.S. PATENT DOCUMENTS

| | | |
|---|---|---|
| 3,310,447 A | 3/1967 | Matthews |
| 3,463,202 A | 8/1969 | Brand et al. |
| 3,586,558 A | 6/1971 | Galloway et al. |
| 3,655,310 A | 4/1972 | Smith |
| 3,905,853 A | 9/1975 | Stent |
| 5,229,056 A | 7/1993 | De Meyer et al. |
| 5,273,080 A | 12/1993 | Morohashi et al. |
| 6,455,115 B1 | 9/2002 | DeMeyer |
| 7,572,745 B2 | 8/2009 | Branch et al. |
| 2008/0006338 A1 | 1/2008 | Wideman et al. |
| 2009/0229696 A1 | 9/2009 | Warren |

FOREIGN PATENT DOCUMENTS

| | | |
|---|---|---|
| CN | 201510500128.9 | 6/2018 |
| EP | 0481772 | 4/1992 |
| WO | 2016/091057 | 6/2018 |

OTHER PUBLICATIONS

Written Opinion of PCT/CN2015/095244.
RO/101 of PCT/CN2015/095244.
Search Report of PCT/CN2015/095244.
European search report of EP15868375.
Preliminary report of PCTCN2015095244.

STITCHED DOUBLE LAYER COMPOSITE HOSE AND MANUFACTURING METHOD THEREOF

CROSS REFERENCE OF RELATED APPLICATION

This application is a divisional application of U.S. patent application Ser. No. 15/127,410, filed Sep. 19, 2016, which was a U.S. National Stage under 35 U.S.C. 371 of the International Application PCT/CN2015/095244, filed Nov. 23, 2015, which claims priority under 35 U.S.C. 119(a-d) to CN 201410743605.X, filed Dec. 9, 2014; CN 201510043462.6, filed Jan. 29, 2015; and CN 201510500128.9, filed Aug. 17, 2015, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE PRESENT INVENTION

Field of Invention

This invention relates to the technical field of pipelines, and specifically a stitched double layer composite hose and a manufacturing method thereof.

Description of Related Arts

For the stitched double layer composite hose which is presently produced at home and abroad, when producing its fabric pipe layer, the traditional weaving method is adopted to produce single-layer plain or twill hose textile, then make a double middle by latching a fabric pipe layer on the outside of another fabric pipe layer, with different calibers between inner and outer fabric pipe layers, and this double fabric pipe layer is stiff and compactness between inner and outer layers is poor. The composite hose produced using this fabric pipe layer has weak peel-strength, rough surface, weak resistance to high pressure, strong resistance to water-flow, poor wear resistance, and easy to slip, not satisfying market needs.

SUMMARY OF THE PRESENT INVENTION

A purpose of this invention is to provide a stitched double layer composite hose with a fabric pipe layer in stitched double-layer structure and the manufacturing method thereof, thereby solving problems in the stitched double layer composite hose of double-layer casing fabric pipe layer.

This invention is realized by means of the following technical solution:

In a first aspect, this invention provides a stitched double layer composite hose which comprises a fabric pipe layer, an inner surface composite colloid material layer and an outer surface composite colloid material layer; wherein: a structure of the fabric pipe layer is a double-layer unit structure with stitched wefts, the double-layer unit structure comprises an outer layer, an inner layer and the stitched wefts, and the inner layer comprises inner layer warps and inner layer wefts; the outer layer comprises outer layer warps and outer layer wefts, the stitched wefts interweave with the outer layer warps and the inner layer warps, for conjoining the inner layer and the outer layer together.

In a second aspect, this invention also provides a manufacturing method of the stitched double layer composite hose, comprising the following steps of:

weaving the fabric pipe layer, which comprises steps of: first, determining total amount of warps in a fabric pipe layer according to an amount of the warps in a single complete cycle unit and an amount of cycles of complete cycle units; then, setting total amount of the warps, at a same time, weaving the inner layer and the outer layer of the fabric pipe layer respectively, and interweaving the inner layer and the outer layer through stitched wefts, for conjoining the inner layer and the outer layer together to form the fabric pipe layer; and colloid compositing, which comprises steps of: co-extruding coating rubber compound/thermoplastic elastomer on inner and outer surfaces of the fabric pipe layer once, or lining the rubber compound/thermoplastic elastomer on the inner surface and color painting on the outer surface.

As a preferred embodiment, a weaving structure of the fabric pipe layer is a double twill structure or double plain structure, and the total amount of the warps in the fabric pipe layer is determined in following manners, wherein:

when the weaving structure is in double twill stitching, the weaving structure is weaved using n complete cycle units, the amount of the warps in each complete cycle unit is 6, and the total amount of the warps in the fabric pipe layer is 6n+4;

when the weaving structure is in double plain stitching, the weaving structure is weaved using n complete cycle units, the amount of the warps in each complete cycle unit is 4, and the total amount of the warps in the fabric pipe layer is 4n+2.

As a preferred embodiment, the complete cycle unit applies the following weaving method comprising steps of: driving wefts by synchronous circling motions of set amount of shuttles on a weaving machine, making the wefts shuttling through layered warps to weave, cooperating with set amount of noseplates in a same weaving cycle for leasing, making shuttle lead wefts through the layered warps to connect inner and outer textiles, thus completing the weaving of the fabric pipe layer.

As a preferred embodiment, there are three shuttles.

As a preferred embodiment, when the complete cycle unit is in double twill stitching, the weaving method is as follows: the noseplate cooperating with a first shuttle has the following three leasing movements successively: one up one down one up three down, two down one up one down one up one down, one up three down one up one down (↑↓↑↓↓↓, ↓↓↑↓↑↓, ↑↓↓↓↑↓) and the shuttle leads wefts through layered warps to carry out the outer layer weaving; the noseplate cooperating with a second shuttle has the following three leasing movements successively: three up one down one up one down, one up one down three up one down, one up one down one up one down two up (↑↑↑↓↑↓, ↑↓↑↑↑↓, ↑↓↑↓↑↑) and the shuttle leads wefts through layered warps to carry out the inner layer weaving; the noseplate cooperating with a third shuttle has the following three leasing movements successively: two up two down one up one down, one up one down two up two down, two down one up one down two up (↑↑↓↓↑↓, ↑↓↑↑↓↓, ↓↓↑↓↑↑), and the third shuttle leads wefts through layered warps to carry out the connection of inner and outer textiles, thereby achieving the weaving of double twill weft stitching the fabric pipe layer of the hose.

As a preferred embodiment, when the complete cycle unit is in double plain stitching, the weaving method is as follows: the specially made noseplate cooperating with the first shuttle has the following two leasing movements successively: one up three down, two up(down) one up one down (↑↓↓↓, ↓↓↑↓), and the shuttle leads wefts through layered warps to carry out the outer layer weaving; the noseplate cooperating with the second shuttle has the following two leasing movements successively: three up one down, one up one down two up (↑↑↑↓, ↑↓↑↑), and the shuttle leads wefts through layered warps to carry out the inner layer weaving; the noseplate cooperating with the third shuttle has the following two leasing movements successively: two up two down, two down two up (↑↑↓↓, ↓↓↑↑), and the third shuttle leads wefts through layered warps to carry out the connection of inner and outer textiles, thereby achieving the weaving of double plain weft stitching the fabric pipe layer of the hose.

As a preferred embodiment, the rubber compound/thermoplastic elastomer is a high polymer elastomer compound, and the color painting is a high polymer elastomer color paste.

As a preferred embodiment, the rubber compound/thermoplastic elastomer is made of TPU, and the color painting is made of water-based TPU.

For the high-strength fiber double composite studied and produced according to this patent, its fabric pipe layer is a whole hose textile combined by using special weaving machine weaving inner and outer layers and at the same time through weft stitching to make relative independent inner and outer layers be weaved, making the textile flat and soft. This composite hose has greatly improved the resistance to pressure, finally solves the problem of large caliber composite hose's low resistance to pressure, with weak resistance to water-flow. The wear resistance of finished product is greatly improved. When the surface protective layer is worn, there is an outer layer of double stitched fabric pipe layer protecting the inner layer without the exposure of the lining. Even if without coating any protective layer to the surface of double stitched fabric pipe layer, its high strength outer layer still protects the inner layer. As a result, this patent of invention of high strength fiber stitched double layer composite hose especially applies to long-range field transport of gas and liquid media, and has relatively broad application prospects.

The weaving theory of this invention is as follows: driving wefts by synchronous circling motions of set amount of shuttles on a weaving machine, making the wefts shuttling through the layered warps to weave, cooperating with set amount of noseplates in the same weaving cycle for leasing, making shuttle lead wefts through the layered warps to connect the inner and outer textiles, thus completing the weaving of the fabric pipe layer of the hose.

The main differences between this weaving method and double casing fabric pipe layer lie in the following:

1. The amount of warps in a complete cycle unit is twice of that of a single-layer hose, and the amount of wefts in a complete cycle unit is three times of that of a single-layer hose;

2. If the wove stitched wefts are dismantled, there are still two complete and relatively independent inner and outer textile layers;

3. The amount increase of wefts can greatly improve pressure-resistance and wear resistance of the fabric pipe layer;

4. The stitched double fabric pipe layer is soft, with low coefficient of elongation and expansion, and less degree of torsion.

Beneficial effects of this invention are as follows:

1. The wove fabric pipe layer overcomes the problem of stitched double layer composite hose in traditional double casing fabric pipe layer;

2. The increase in the amount of wefts can greatly improve pressure-resistance and wear resistance of the fabric pipe layer;

3. It has such advantages as long service life, high flexibility, less interweaving points, less loss of yarn strength and less degree of torsion;

4. The fabric pipe layer with special coating equipment and special coating process can be directly produced into a stitched double layer composite hose satisfying market needs with large caliber, high dielectric strength and higher flexibility. The production process is simple, featured with extremely high utility value and worthy of promotion for production.

BRIEF DESCRIPTION OF THE DRAWINGS

Other features, objects, and advantages of the invention will become more apparent from reading the description of non-limiting embodiments detailed with reference to the following figures.

Figure 1:
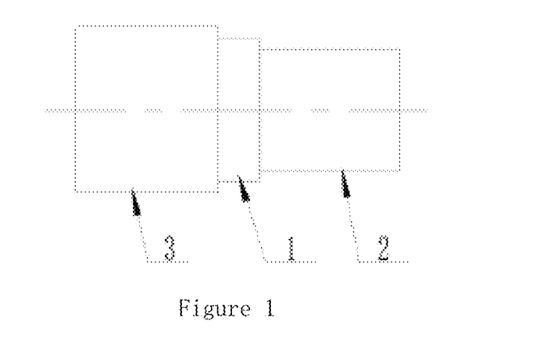
FIG. 1 is a structure diagram of the invention.
Figure 2:
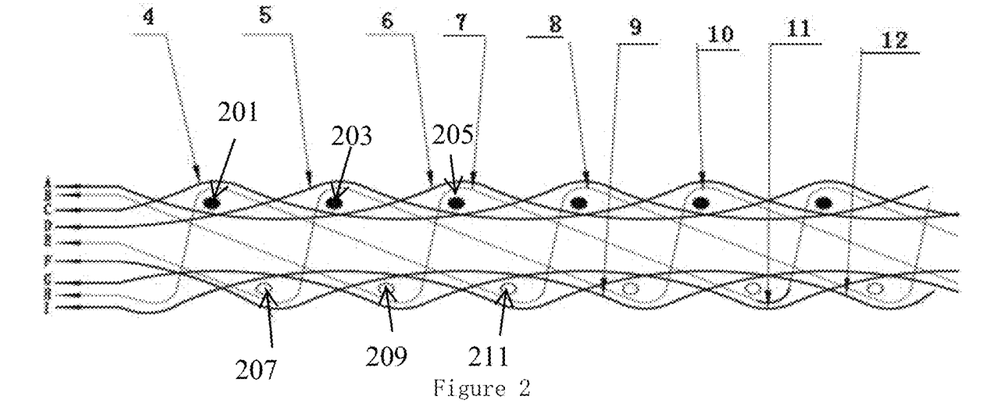
FIG. 2 is a stitching structure diagram of the fabric pipe layer in a double twill stitching structure.
Figure 3:
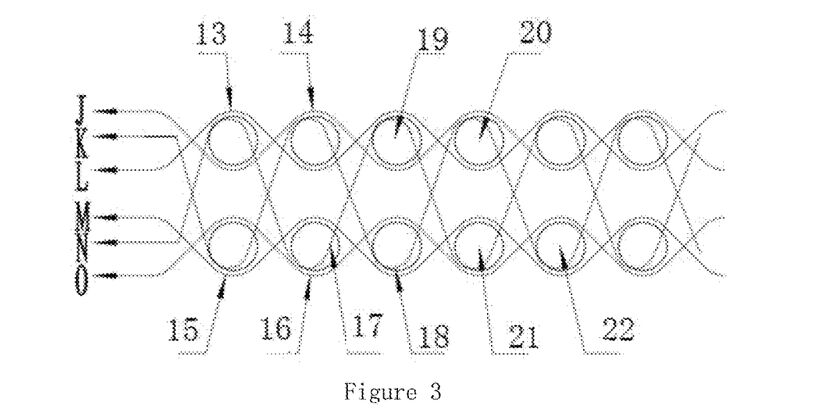
FIG. 3 is a stitching structure diagram of the fabric pipe layer in a double plain stitching structure.
Figure 4:
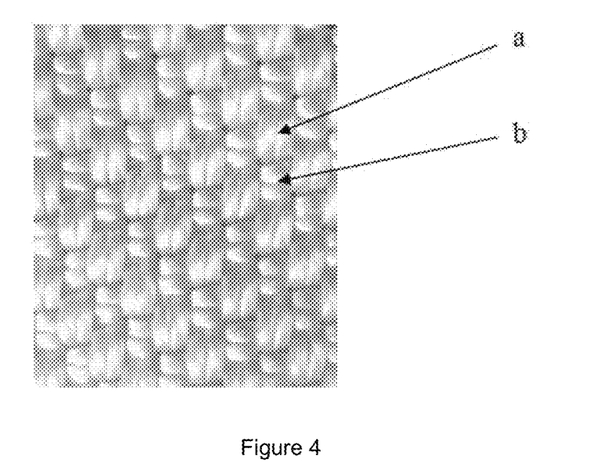
FIG. 4 is an outside surface physical image of the outer layer of the fabric pipe layer in the double twill stitching structure.
Figure 5:
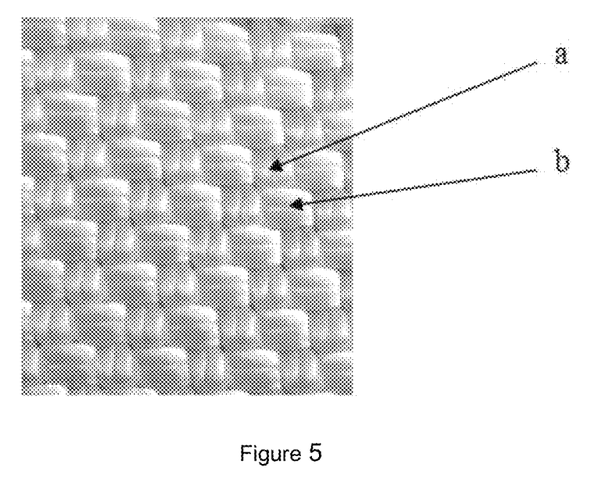
FIG. 5 is an inside surface physical image of the outer layer of the fabric pipe layer in the double twill stitching structure.
Figure 6:
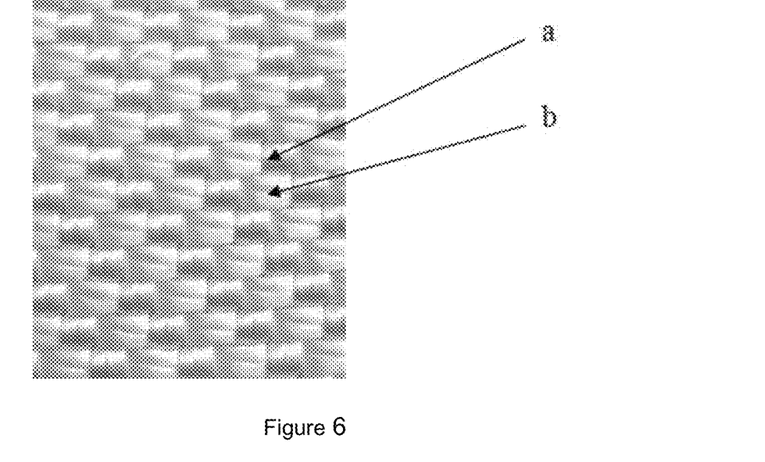
FIG. 6 is an outside surface physical image of the inner layer of the fabric pipe layer in the double twill stitching structure.
Figure 7:
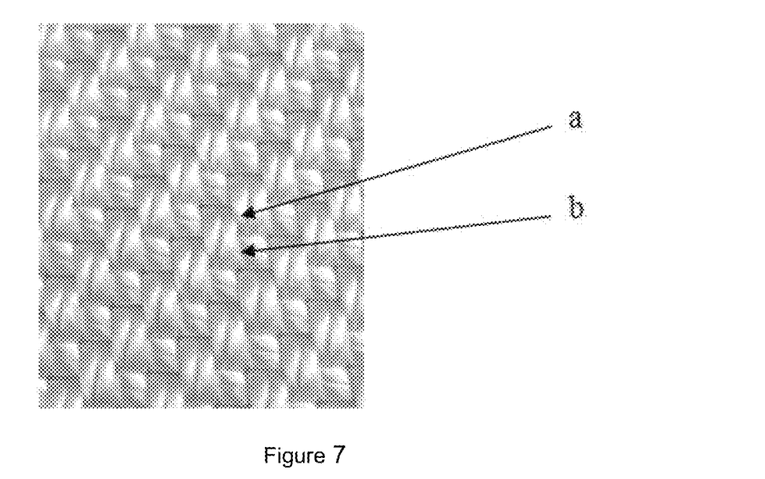
FIG. 7 is an inside surface physical image of the inner layer of the fabric pipe layer in the double twill stitching structure.

In the figures: 1. fabric pipe layer; 2. inner surface composite colloid material layer; 3. outer surface composite colloid material layer; 4. twill weaving's first shuttle and second circle; 5. twill weaving's first shuttle and third circle; 6. twill weaving's first shuttle and first circle; 7. twill weaving's third shuttle and second circle; 8. twill weaving's third shuttle and third circle; 9. twill weaving's second shuttle and first circle; 10. twill weaving's third shuttle and first circle; 11. twill weaving's second shuttle and second circle; 12. twill weaving's second shuttle and third circle; a. warps; b. wefts; c. outer layer of twill weaving layer; d. inner and outer layers stitched wefts; e. inner layer of twill weaving layer; A, C, D are wefts on the first shuttle of twill weaving, twill weaving with the single-layer formed by outer layer warps; F, G, I are wefts on the second shuttle, twill weaving with the single-layer formed by inner layer warps; B, E, H are wefts on the third shuttle, making the connection formed by inner and outer layers stitching a whole; 13. plain weaving's first shuttle and second circle; 14. plain weaving's first shuttle and first circle; 15. plain weaving's second shuttle and first circle; 16. plain weaving's second shuttle and second circle; 17. plain weaving's third shuttle and second circle; 18. plain weaving's third shuttle and first circle; 19, 20 are the warps on the first shuttle of plain weaving; 21, 22 are the warps on the second shuttle of plain weaving; J, L are wefts on the first shuttle, plain weaving with the single-layer formed by outer layer warps; M, O are wefts on the second shuttle, plain weaving with the single-layer formed by inner layer warps; K, N are wefts on the third shuttle, making the connection formed by inner and outer layers stitching a whole.

DETAILED DESCRIPTION OF THE PREFERRED EMBODIMENT

The invention is elaborated below with specific embodiments. The following embodiments will help provide further understanding of the invention for those skilled in the art, and not in any way limit the invention. It shall be noted that several variants and improvements can be made without departing from concept of the invention for those of ordinary skill in the art. All these fall within the scope of protection of the invention.

As shown in FIG. 1, this invention provides a double layer composite hose, comprising a fabric pipe layer 1, an inner surface composite colloid material layer 2, and an outer surface composite colloid material layer 3, wherein:

when a structure of the fabric pipe layer 1 is a double-layer twill unit structure, six warps form a complete cycle unit, the double-layer twill unit structure comprises an inner layer, an outer layer and independent stitched wefts; the independent stitched wefts interweave with outer layer warps and inner layer warps, for conjoining an inner layer twill textile and an outer layer twill textile together;

when the structure of the fabric pipe layer 1 is a double-layer plain unit structure, four warps form a complete cycle unit, the double-layer plain unit structure comprises an inner layer, an outer layer and independent stitched wefts, and the inner layer comprises inner layer warps and inner layer wefts, the outer layer comprises outer layer warps and outer layer wefts, and the independent stitched wefts interweave with the outer layer warps and the inner layer warps, for conjoining an inner layer plain textile and an outer layer plain textile together.

As shown in FIG. 2, it is a diagram showing the complete cycle unit structure of the fabric pipe layer 1, and the complete cycle unit structure is a double-layer twill stitching structure, in the figure: 4 is twill weaving's first shuttle and second circle; 5 is twill weaving's first shuttle and third circle; 6 is twill weaving's first shuttle and first circle; 7 is twill weaving's third shuttle and second circle; 8 is twill weaving's third shuttle and third circle; 9 is twill weaving's second shuttle and first circle; 10 is twill weaving's third shuttle and first circle; 11 is twill weaving's second shuttle and second circle; 12 is twill weaving's second shuttle and third circle; a are warps; b are wefts; c is an outer layer of twill weaving layer; d are stitched wefts of inner and outer layers; e is an inner layer of twill weaving layer; A, C, D are single-layer twill weavings formed by wefts on the first shuttle and the outer layer warps; F, G, I are single-layer twill weaving formed by wefts on the second shuttle and the inner layer warps; B, E, H are wefts on the third shuttle, for stitching the inner and outer layers as a whole. The inner layer warps comprise a first warp 201, a second warp 203 and a third warp 205 in a first row; the inner layer wefts comprise a first weft A, a second weft C, and a third weft D; the first warp 201, the second warp 203 and the third warp 205 interweave with the first weft A, the second weft C and the third weft D; The outer layer warps comprise a fourth warp 207, a fifth warp 209 and a sixth warp 211 in a second row parallel to the second row; the outer layer wefts comprise a fourth weft F, a fifth weft G and a sixth weft I; and the fourth warp 207, the fifth warp 209 and the sixth warp 211 interweave with the fourth weft F, the fifth weft G and the sixth weft I; and the stitching wefts comprise a seventh weft B, an seventh weft E and a ninth weft H; the seventh weft B is woven below the fifth warp 209 and above the third warp 205; the seventh weft E is woven above the first warp 201 and below the sixth warp 211; and the ninth weft H is woven below the fourth warp 207, and above the second warp 203. The first weft A is woven below both the first warp 201 and the second warp 203, and then above the third warp 205; the second weft C is woven above the first warp 201 and below both the second warp 203 and the third warp 205; and wherein the third weft D is woven below the first warp 201, above the second warp 203 and below the third warp 205. The fourth weft F is woven below the fourth warp 207, and then above the fifth warp 209 and the sixth warp 211; the fifth weft G is woven above the fourth warp 207, below the fifth warp 209 and then above the sixth warp 211; and the sixth weft I is woven above the fourth warp 207 and then the fifth warp 209 and below the sixth warp 211.

As shown in FIG. 3, it is a diagram showing the complete cycle unit structure of the fabric pipe layer 1, and the complete cycle unit structure is a double-layer plain stitching structure, in the figure: 13 is plain weaving's first shuttle and the second circle; 14. plain weaving's first shuttle and first circle; 15. plain weaving's second shuttle and first circle; 16. plain weaving's second shuttle and second circle; 17. plain weaving's third shuttle and second circle; 18. plain weaving's third shuttle and first circle; 19, 20 are the warps on the first shuttle of plain weaving; 21, 22 are the warps on the second shuttle of plain weaving; J, L are single-layer plain weaving formed by wefts on the first shuttle and the outer layer warps; M, O are single-layer plain weaving formed by wefts on the second shuttle and the inner layer warps; K, N are wefts on the third shuttle, stitching inner and outer layers as a whole.

This invention also refers to a manufacturing method of a stitched double layer composite hose, comprising the following steps of:

weaving a fabric pipe layer, which comprises steps of: first, determining total amount of warps in a fabric pipe layer according to an amount of warps in a single complete cycle unit and an amount of cycles of complete cycle units; then, setting total amount of warps, at a same time, weaving an inner layer and an outer layer of the fabric pipe layer respectively, and interweaving the inner layer and the outer layer through stitched wefts, for conjoining the inner layer and the outer layer together to form the fabric pipe layer; and colloid compositing, which comprises steps of: co-extruding rubber compound/thermoplastic elastomer on inner and outer surfaces of the fabric pipe layer once, or lining the rubber compound/thermoplastic elastomer on the inner surface and color painting on the outer surface.

As a preferred embodiment, a weaving structure of the fabric pipe layer is a double twill structure or a double plain structure, and the total amount of warps in the fabric pipe layer is determined in following manners:

When the weaving structure is in double twill stitching, the weaving structure is weaved using n complete cycle units, the amount of warps in each complete cycle unit is 6, and the total amount of the warps in the fabric pipe layer is 6n+4. That is: for the double-layer twill stitching weaving, the total amount of the warps under control (the total amount of threading reeds) minus 4 must be a multiple of 6;

When the weaving structure is in double plain stitching, the weaving structure is weaved using n complete cycle units, the amount of the warps in each complete cycle unit is 4, and the total amount of the warps in the fabric pipe layer is 4n+2. That is: for the double-layer plain stitching weaving, the total amount of the warps under control (the total amount of threading reeds) minus 2 must be a multiple of 4, and the warps are arranged according to regularity in a weaving cycle; and the amount of the warps in each unit of the warps (also known as one reed) can be odd number or even number.

The complete cycle unit applies the following weaving method, which comprises steps of: driving wefts by synchronous circling motions of set amount of shuttles on a weaving machine, making the wefts shuttling through layered warps to weave, cooperating with set amount of noseplates in a same weaving cycle for leasing, making shuttle lead wefts through the layered warps to connect inner and outer textiles, thus completing the weaving of the fabric pipe layer.

When the complete cycle unit is in double twill stitching, the weaving method is as follows: the noseplate cooperating with a first shuttle has the following three leasing movements successively: one up one down one up three down, two down one up one down one up one down, one up three down one up one down (↑↓↑↓↓↓, ↓↓↑↓↑↓, ↑↓↓↓↑↓) and the shuttle leads wefts through layered warps to carry out the outer layer weaving; the noseplate cooperating with a second shuttle has the following three leasing movements successively: three up one down one up one down, one up one down three up one down, one up one down one up one down two up (↑↑↑↓↑↓, ↑↓↑↑↑↓, ↑↓↑↓↑↑) and the shuttle leads wefts through layered warps to carry out the inner layer weaving; the noseplate cooperating with a third shuttle has the following three leasing movements successively: two up two down one up one down, one up one down two up two down, two down one up one down two up (↑↑↓↓↑↓, ↑↓↑↑↓↓, ↓↓↑↓↑↑), and the third shuttle leads wefts through layered warps to carry out the connection of inner and outer textiles, thereby achieving the weaving of double twill weft stitching the fabric pipe layer of the hose.

When the complete cycle unit is in double plain stitching, the weaving method is as follows: the noseplate cooperating with the first shuttle has the following two leasing movements successively: one up three down, two up (down) one up one down (↑↓↓↓, ↓↓↑↓), and the shuttle leads wefts through layered warps to carry out the outer layer weaving; the noseplate cooperating with the second shuttle has the following two leasing movements successively: three up one down, one up one down two up (↑↑↑↓, ↑↓↑↑), and the shuttle leads wefts through layered warps to carry out the inner layer weaving; the noseplate cooperating with the third shuttle has the following two leasing movements successively: two up two down, two down two up (↑↑↓↓, ↓↓↑↑), and the third shuttle leads wefts through layered warps to carry out the connection of inner and outer textiles, thereby achieving the weaving of double plain weft stitching the fabric pipe layer of the hose.

The warps and wefts are made of any high-strength fiber thread.

As a preferred embodiment, the rubber compound/thermoplastic elastomer is a high polymer elastomer compound, and the color painting is a high polymer elastomer color paste.

As a preferred embodiment, the rubber compound/thermoplastic elastomer is made of TPU, and the color painting is made of water-based TPU.

As shown in FIGS. 4-7, they are an outside surface physical image of the outer layer of fabric pipe layer in stitching double-layer twill, an inside surface physical image of the outer layer of fabric pipe layer in stitching double-layer twill, an outside surface physical image of the inner layer of fabric pipe layer in stitching double-layer twill and an inside surface physical image of the inner layer of fabric pipe layer in stitching double-layer twill respectively.

Figure 8:
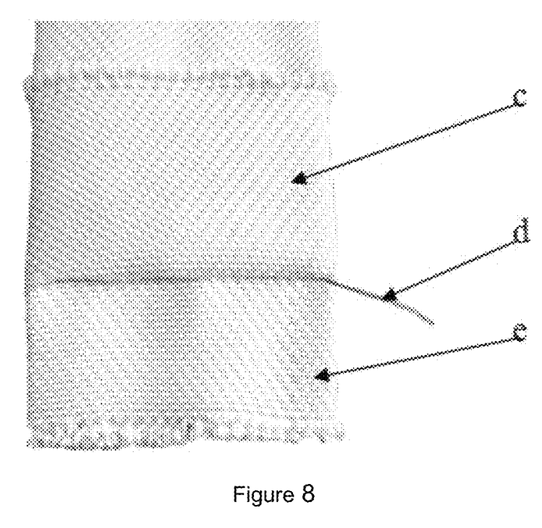
FIG. 8 is an overall physical image of the inner and outer layers of the fabric pipe layer in the double twill stitching structure.

As shown in FIG. 8, it is an overall physical image of inner and outer layers of the middle in stitching double-layer twill, and it is molded product structure. In addition, the outer layer of twill weaving layer c and the inner layer of twill weaving layer e are connected by the inner and outer layers stitched wefts d.

The following describes two embodiments of this invention, and details are shown as follows:

Embodiment 1

This embodiment is a double-layer twill composite hose, comprising a fabric pipe layer of stitching double twill structure, inner surface and outer surface composite colloid material layer of the fabric pipe layer. The structure of the fabric pipe layer is a double-layer twill unit structure stitched by stitched wefts, six warps form a complete cycle unit, the double-layer twill unit structure comprises an inner layer, an outer layer and independent stitched wefts, and the independent stitched wefts interweave with outer layer warps and inner layer warps, for conjoining an inner layer twill textile and an outer layer twill textile together.

In this embodiment, the manufacturing method of the stitched double layer composite hose comprises the following steps of:

Step 1, weaving a fabric pipe layer, wherein:

in this embodiment, an amount of warps in a complete cycle units is 6, and an amount of cycles in the complete cycle unit is 106, so a total amount of the warps in the fabric pipe layer can be calculated to be 640;

weave an outer layer by a first shuttle alone, weave an inner layer by a second shuttle alone, and weave stitched wefts by a third shuttle, the third shuttle's stitched wefts interweave with outer layer warps and inner layer warps, for conjoining the inner layer and the outer layer together; and Step 2, colloid compositing, which comprises steps of:

co-extruding rubber compound/thermoplastic elastomer on inner and outer surfaces of the fabric pipe layer once, or lining the rubber compound/thermoplastic elastomer on the inner surface and color painting on the outer surface, wherein: the rubber compound/thermoplastic elastomer is a high polymer elastomer compound, the color painting is a high polymer elastomer color paste, the rubber compound/thermoplastic elastomer is made of TPU, and the color painting is made of water-based TPU.

Embodiment 2

This embodiment is a double-layer plain composite hose, comprising a fabric pipe layer of stitched double plain structure, inner surface and outer surface composite colloid material layer of the fabric pipe layer, and the structure of the fabric pipe layer is a double-layer plain unit structure stitched by stitched wefts, and four warps form a complete cycle unit, and the double-layer plain unit structure comprises an inner layer, an outer layer and independent stitched wefts, and the inner layer comprises inner layer warps and inner layer wefts, the outer layer comprises outer layer warps and outer layer wefts, and the independent stitched wefts interweave with the outer layer warps and the inner layer warps, for conjoining an inner layer plain textile and an outer layer plain textile together.

In this embodiment, the manufacturing method of the stitched double layer composite hose comprises the following steps of:

Step 1, weaving a fabric pipe layer, wherein:

in this embodiment, an amount of warps in a complete cycle units is 4, and an amount of cycles in the complete cycle unit is 159, so a total amount of the warps in a fabric pipe layer can be calculated to be 638;

weave an outer layer by a first shuttle alone, weave an inner layer by a second shuttle alone, and weave stitched wefts by a third shuttle, the third shuttle's stitched wefts interweave with outer layer warps and inner layer warps, for conjoining the inner layer and the outer layer together; and Step 2, colloid compositing, which comprises steps of:

co-extruding rubber compound/thermoplastic elastomer on inner and outer surfaces of the fabric pipe layer once, or lining the rubber compound/thermoplastic elastomer on the inner surface and color painting on the outer surface, wherein: the rubber compound/thermoplastic elastomer is a high polymer elastomer compound, and the color painting is a high polymer elastomer color paste, the rubber compound/thermoplastic elastomer is made of TPU, and the color painting is made of water-based TPU.

Specific embodiments of the invention are described above. It shall be understood that the invention is not limited to the above specific embodiments, and those skilled in the art can make different variants and modifications within the scope of the claims, and it shall not affect the substance of the invention.

What is claimed is:

1. A stitched double layer composite hose, comprising:
a fabric pipe layer;
an inner surface composite colloid material layer; and
an outer surface composite colloid material layer, wherein the fabric pipe layer comprises an outer layer, an inner layer and stitching wefts;
the inner layer comprises inner layer warps and inner layer wefts; the outer layer comprises outer layer warps and outer layer wefts; the stitching wefts interweave with the outer layer warps and the inner layer warps for conjoining the inner layer and the outer layer together;
wherein the inner layer warps comprise a first warp, a second warp and a third warp in a first row; the inner layer wefts comprise a first weft, a second weft, and a third weft; the first warp, the second warp and the third warp interweave with the first weft, the second weft and the third weft;
wherein the outer layer warps comprise a fourth warp, a fifth warp and a sixth warp in a second row parallel to the second row; the outer layer wefts comprise a fourth weft, a fifth weft and a sixth weft; and the fourth warp, the fifth warp and the sixth warp interweave with the fourth weft, the fifth weft and the sixth weft; and
wherein the stitching wefts comprise a seventh weft, an eighth weft and a ninth weft; the seventh weft is woven below the fifth warp and above the third warp; the eighth weft is woven above the first warp and below the sixth warp; and the ninth weft is woven below the fourth warp, and above the second warp.

2. The stitched double layer composite hose as recited in claim 1, wherein the warps and wefts are made of fiber threads.

3. The stitched double layer composite hose, as recited in claim 1, wherein the first weft is woven below both the first warp and the second warp, and then above the third warp; the second weft is woven above the first warp and below both the second warp and the third warp; and wherein the third weft is woven below the first warp, above the second warp and below the third warp.

4. The stitched double layer composite hose, as recited in claim 3, wherein the fourth weft is woven below the fourth warp, and then above the fifth warp and the sixth warp; the fifth weft is woven above the fourth warp, below the fifth warp and then above the sixth warp; and the sixth weft is woven above the fourth warp and then the fifth warp and below the sixth warp.

* * * * *